(12) United States Patent
Lo

(10) Patent No.: US 7,275,608 B2
(45) Date of Patent: Oct. 2, 2007

(54) MOTOR-DRIVEN VEHICLE WITH A VEHICLE FRAME AND A DRIVING DEVICE THAT ARE INTERCONNECTED REMOVABLY

(75) Inventor: Kemble Lo, Miao Li Hsien (TW)

(73) Assignee: Giant Manufacturing Co., Ltd., Taichung (TW)

( * ) Notice: Subject to any disclaimer, the term of this patent is extended or adjusted under 35 U.S.C. 154(b) by 358 days.

(21) Appl. No.: 11/141,062

(22) Filed: Jun. 1, 2005

(65) Prior Publication Data

US 2006/0272865 A1 Dec. 7, 2006

(51) Int. Cl.
*B62D 27/06* (2006.01)
(52) U.S. Cl. .......................................... 180/11; 180/208
(58) Field of Classification Search .................. 180/11, 180/15, 16, 208
See application file for complete search history.

(56) References Cited

U.S. PATENT DOCUMENTS

| | | | | |
|---|---|---|---|---|
| 4,944,359 A | * | 7/1990 | Doman et al. ............... | 180/208 |
| 5,074,372 A | * | 12/1991 | Schepis ....................... | 180/208 |
| 5,154,251 A | * | 10/1992 | Fought ......................... | 180/208 |
| 5,291,959 A | * | 3/1994 | Malblanc ..................... | 180/11 |
| 6,135,222 A | * | 10/2000 | Furukawa ................... | 180/65.5 |

* cited by examiner

*Primary Examiner*—Kevin Hurley
(74) *Attorney, Agent, or Firm*—Harness, Dickey & Pierce, P.L.C.

(57) ABSTRACT

A motor-driven vehicle includes a vehicle frame and a driving device. The vehicle frame includes a main body and a retaining unit. The main body has a first connecting portion and a second connecting portion. The retaining unit includes a retaining plate disposed pivotally on the first connecting portion and having a free end rotatable to close and open a groove in the first connecting portion. The driving device includes a support frame that has a first engaging portion disposed within the groove, and a second engaging portion connected to the second connecting portion by a tongue and groove engagement. When the groove is closed, removal of the vehicle frame from the driving device is prevented. When the groove is opened, removal of the vehicle frame from the driving device is allowed.

4 Claims, 8 Drawing Sheets

MOTOR-DRIVEN VEHICLE WITH A VEHICLE FRAME AND A DRIVING DEVICE THAT ARE INTERCONNECTED REMOVABLY

BACKGROUND OF THE INVENTION

1. Field of the Invention

The invention relates to a motor-driven vehicle, more particularly to a motor-driven vehicle with a vehicle frame and a driving device that are interconnected removably.

2. Description of the Related Art

As shown in FIG. 1, a conventional motor-driven vehicle includes a vehicle frame 1, a driving device 2 mounted on a rear side of the vehicle frame 1, a head tube unit 3 that is mounted on a front side of the vehicle frame 1 and that is used for steering the motor-driven vehicle, and a seat unit 4 mounted between the driving device 2 and the head tube unit 3.

Although the conventional motor-driven vehicle enables convenient transportation of elderly and/or disabled persons, it is disadvantageous in that the driving device 2 is attached fixedly to the vehicle frame 1. As such, because the driving device 2 is relatively heavy, the aforesaid conventional motor-driven vehicle is hard to transport.

SUMMARY OF THE INVENTION

Therefore, the main object of the present invention is to provide a motor-driven vehicle that includes a driving device, which is removable from a vehicle frame.

Accordingly, a motor-driven vehicle of this invention comprises a vehicle frame and a driving device.

The vehicle frame includes a main body and a retaining unit.

The main body has at least one first connecting portion and a second connecting portion that are interconnected fixedly. The first connecting portion is formed with a groove that has a lower end opening.

The retaining unit includes at least one retaining plate having a pivot end disposed pivotally on the first connecting portion of the main body, and a free end rotatable between a blocking position, where the free end engages the opening of the groove in the first connecting portion of the main body so as to close the opening, and a release position, where the free end is disengaged from the groove so as to open the opening. The free end of the retaining plate is biased to the blocking position.

The driving device includes a support frame disposed under the main body of the vehicle frame, a plurality of wheels mounted rotatably on the support frame, and a driving unit disposed on the support frame for rotating the wheels. The support frame has an elongated first engaging portion disposed within the groove in the first connecting portion of the main body of the vehicle frame, and a second engaging portion engaging the second connecting portion of the main body of the vehicle frame. When the free end of the retaining plate of the retaining unit is disposed at the blocking position, removal of the first engaging portion of the support frame from the groove in the first connecting portion of the main body is prevented. When the free end of the retaining plate is disposed at the release position, removal of the first engaging portion of the support frame from the first connecting portion of the main body is allowed. One of the second connecting portion of the main body and the second engaging portion of the support frame is configured as a tongue, while the other of the second connecting portion of the main body and the second engaging portion of the support frame is configured as a groove.

BRIEF DESCRIPTION OF THE DRAWINGS

Other features and advantages of the present invention will become apparent in the following detailed description of a preferred embodiment with reference to the accompanying drawings, of which.

DETAILED DESCRIPTION OF THE PREFERRED EMBODIMENT

Figure 1:
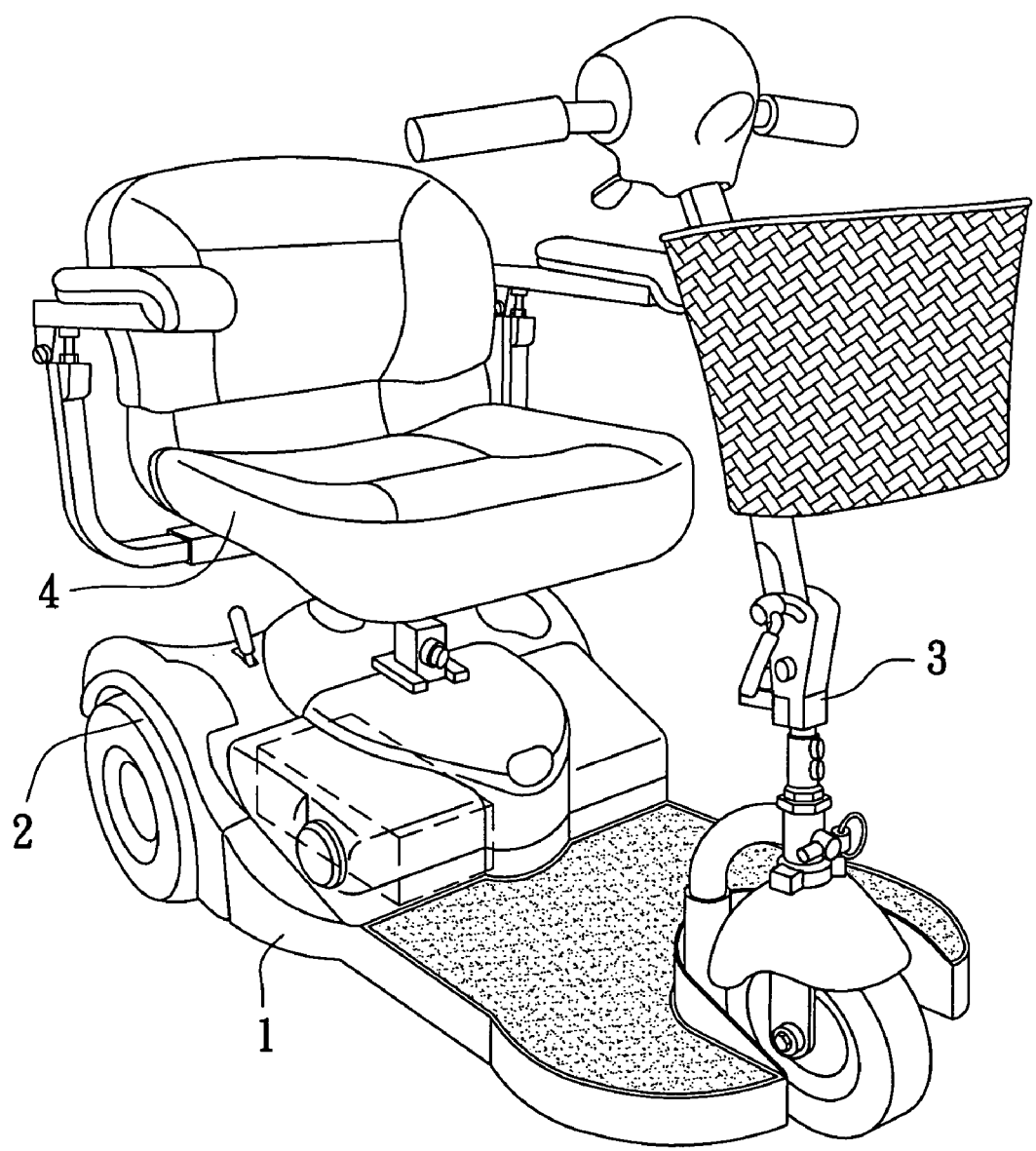
FIG. 1 is a perspective view of a conventional motor-driven vehicle.
Figure 2:
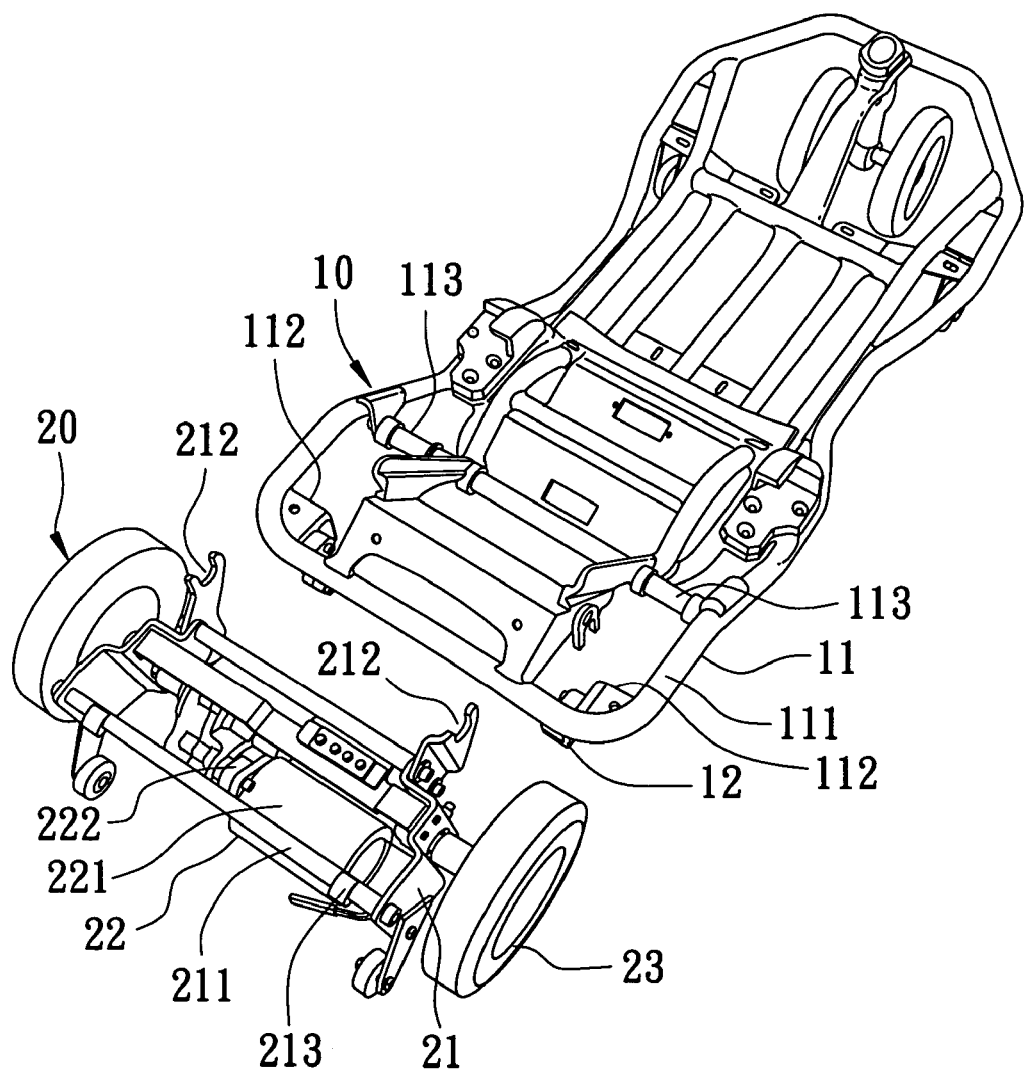
FIG. 2 is a partly exploded perspective view of a vehicle frame and a driving device of a preferred embodiment of a motor-driven vehicle according to the present invention.
Figure 3:
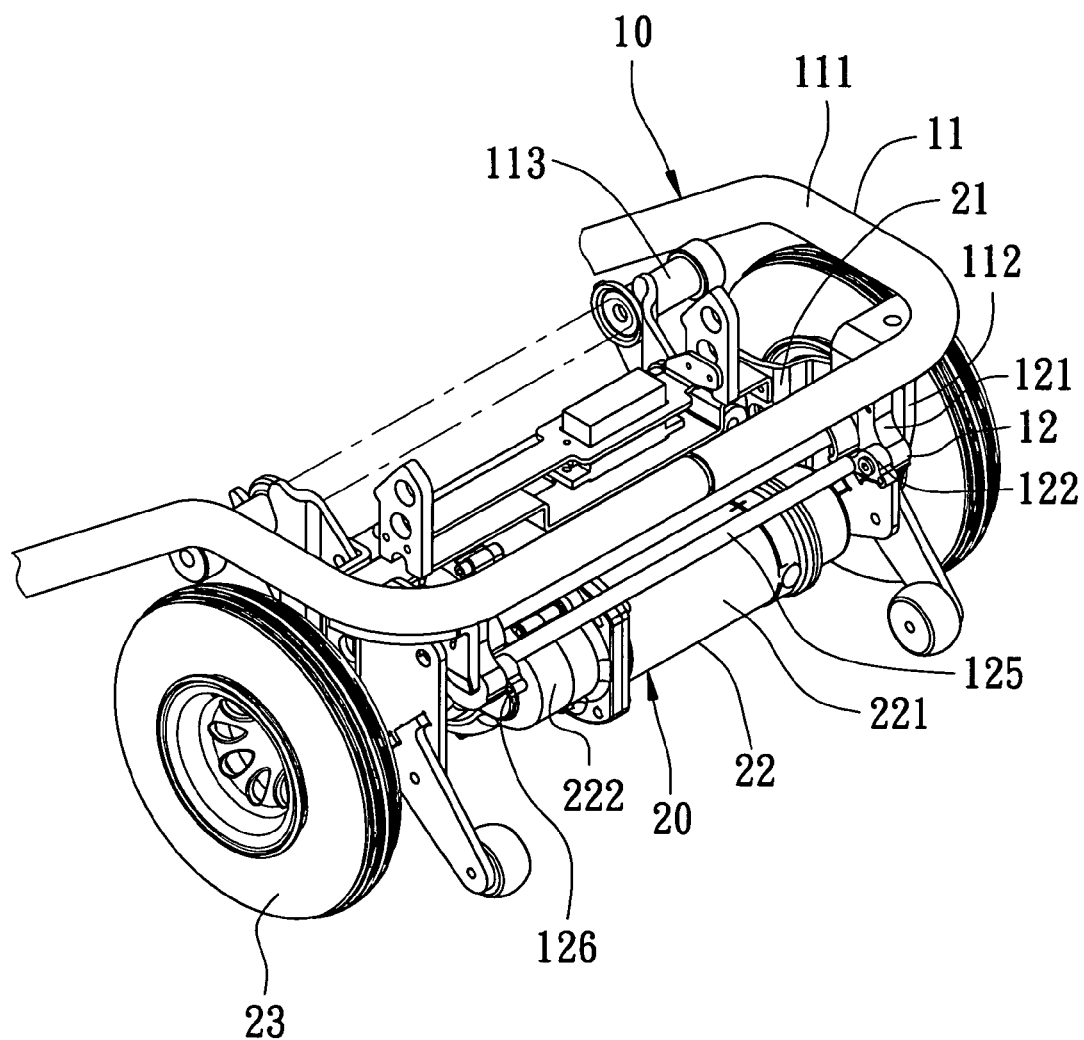
FIG. 3 is an assembled perspective view of the vehicle frame and the driving device of the preferred embodiment.
Figure 4:
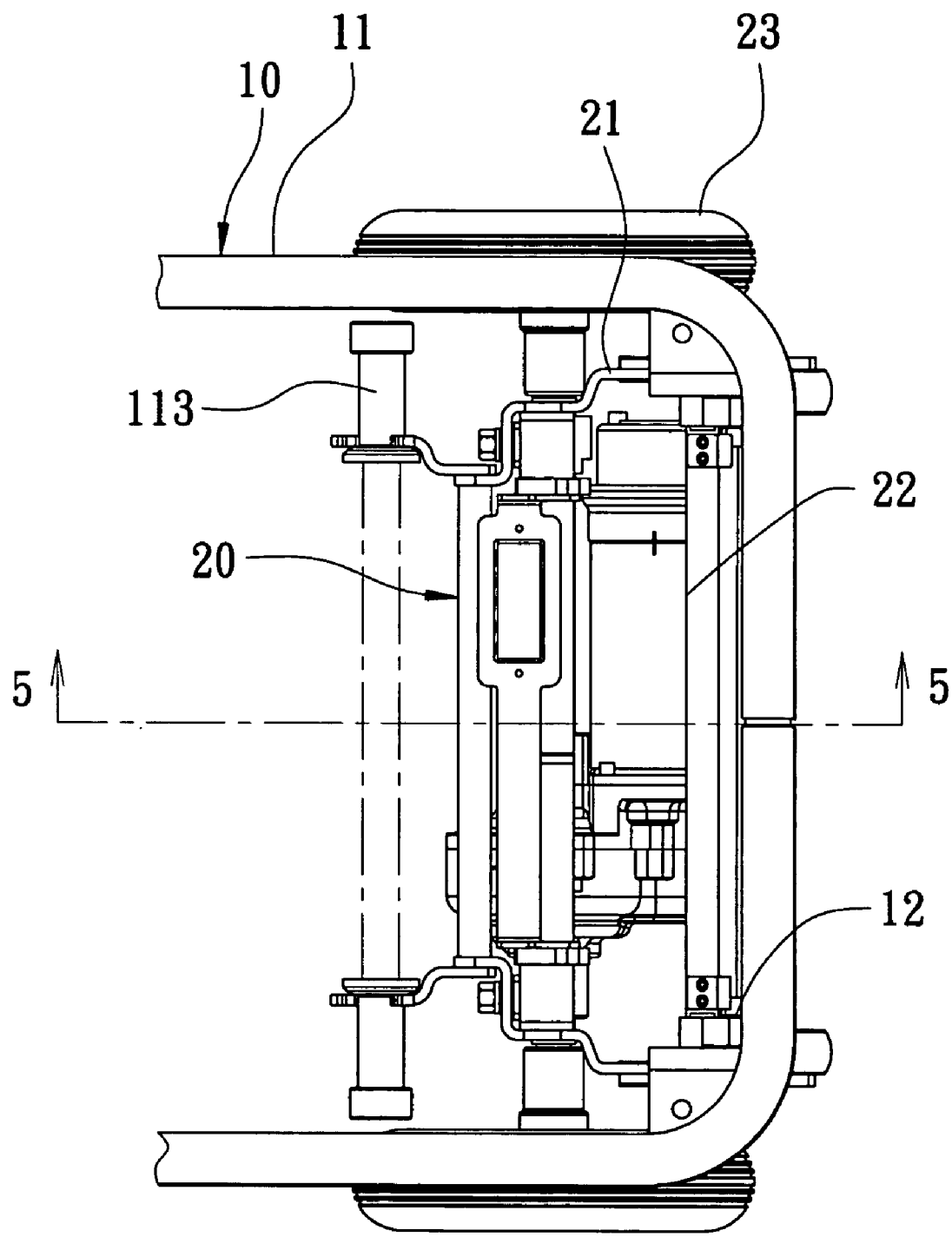
FIG. 4 is a top view of the vehicle frame and the driving device of the preferred embodiment.

Referring to FIGS. 2-5, the preferred embodiment of a motor-driven vehicle according to the present invention includes a vehicle frame 10 and a driving device 20.

The vehicle frame 10 includes a main body 11 and a retaining unit 12.

The main body 11 has a rod member 111 that includes two fixed first connecting portions 112 and two fixed second connecting portions 113. Each of the first connecting portions 112 is formed with a groove 114 that has a lower end opening 115.

The driving device 20 includes a support frame 21 disposed under the main body 11 of the vehicle frame 10, two wheels 23 mounted rotatably on the support frame 21, and a driving unit 22 disposed on the support frame 21 for rotating the wheels 23. The driving unit 22 includes a motor 221 and a speed-reduction gear 222 connected to the motor 221. The support frame 21 has an elongated first engaging portion 211 that is shaped as a rod and that is disposed within the grooves 114 in the first connecting portions 112 of the main body 11 of the vehicle frame 10, and two second engaging portions 212 engaging respectively the second connecting portions 113 of the main body 11 of the vehicle frame 10. The first engaging portion 211 of the support frame 21 has two fixed hook portions 213.

The retaining unit 12 includes two retaining plates 121, two hook plates 122, two first torsional springs 123 and two second torsional springs 124. Each of the retaining plates 121 has a pivot end 121' disposed pivotally on the corresponding first connecting portion 112 of the main body 11, and a free end 121" rotatable between a blocking position shown in FIG. 6, where the free end 121" engages and closes the opening 115 of the groove 114 in the corresponding first connecting portion 112 of the main body 11 and where removal of the first engaging portion 211 from the grooves 114 is prevented, and a release position shown in FIG. 7, where the free end 121" is disengaged from the groove 114 in the corresponding first connecting portion 112 of the main body 11 so as to open the opening 115 of the groove 114 in the corresponding first connecting portion 112 of the main body 11 and where removal of the first engaging portion 211 from the grooves 114 is allowed. Each of the first torsional springs 123 is mounted between the corresponding retaining plate 121 and the corresponding first connecting portion 112 so as to bias the free end 121" of the corresponding retaining plate 121 to the blocking position. Each of the hook plates 122 includes a pivot end 122' disposed pivotally on the corresponding retaining plate 121, and a hook end 122" rotatable on the corresponding retaining plate 121 between an engagement position shown in FIG. 5, where the hook end 122" engages the corresponding hook portion 213 of the first engaging portion 211 of the support frame 21 so as to prevent rotation of the retaining plate 121 relative to the main body 11, and a disengagement position shown in FIG. 6, where the hook end 122" is removed from the corresponding hook portion 213 of the first engaging portion 211 of the support frame 21 so as to allow the rotation of the retaining plate 121 relative to the main body 11. Each of the second torsional springs 124 is mounted between the corresponding retaining plate 121 and the corresponding hook plate 122 so as to bias the hook end 122" of the corresponding hook plate 122 to the engagement position. As such, each of the retaining plates 121 is double locked at the blocking position.

Figure 5:
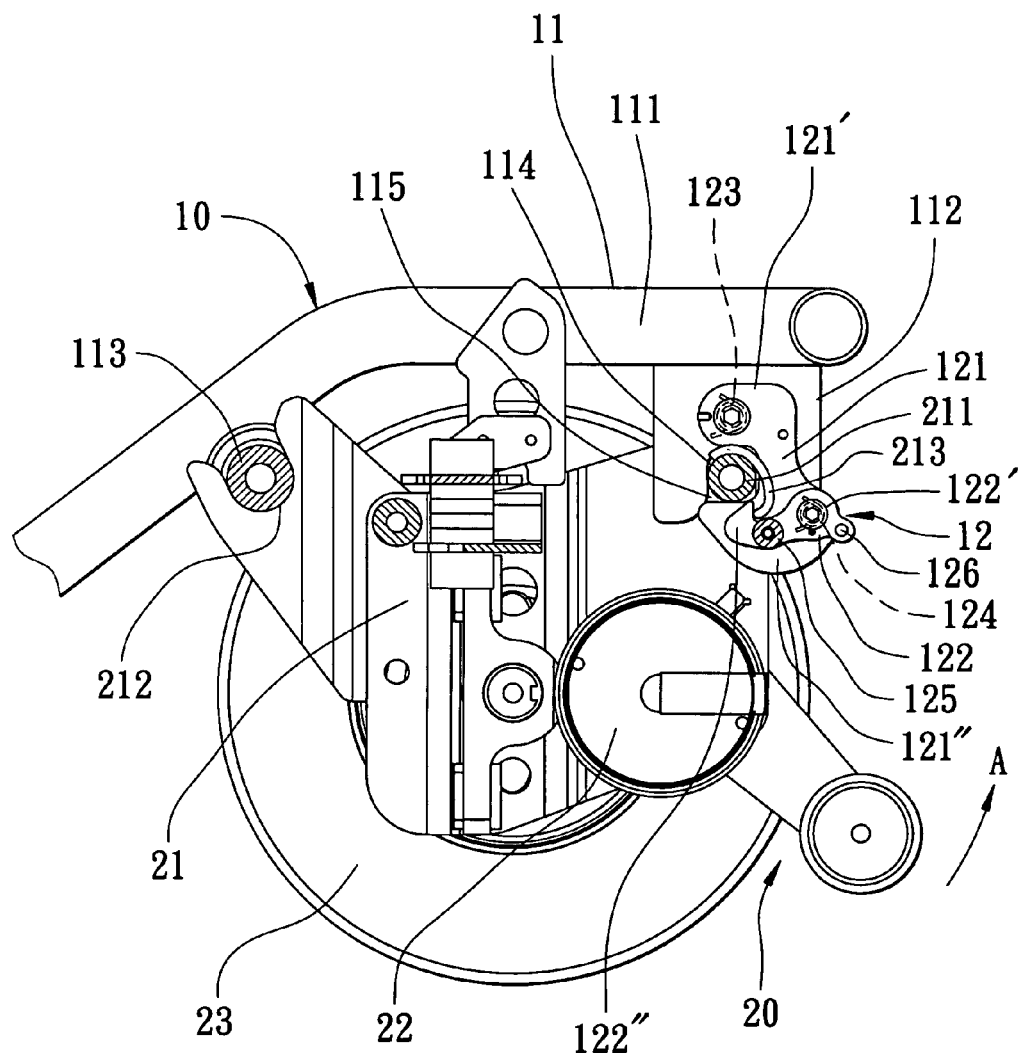
FIG. 5 is a sectional view taken along Line 5-5 in FIG. 4.

The retaining unit 12 further includes an actuation rod 125 that interconnects fixedly the hook plates 122 and that is pivotable upwardly to rotate the hook ends 122" of the hook plates 122 on the retaining plates 121 from the engagement positions to the disengagement positions in a direction (A) (see FIG. 5). Each of the hook plates 122 is further formed with an integral stop rod 126.

Each of the second connecting portions 113 of the vehicle frame 10 is connected to the corresponding second engaging portion 212 of the driving device 20 by a tongue and groove engagement. In this embodiment, the second connecting portions 113 are configured as cylindrical tongues or rods, while the second engaging portions 212 are configured as grooves defined by U-shaped plates. Because the driving device 20 is disposed under the vehicle frame 10, the combined weight of the vehicle frame 10 and the user sitting on the vehicle frame 10 is applied to the driving device 20. Thus, removal of the second connecting portions 113 from the second engaging portions 212 is prevented during use.

Figure 6:
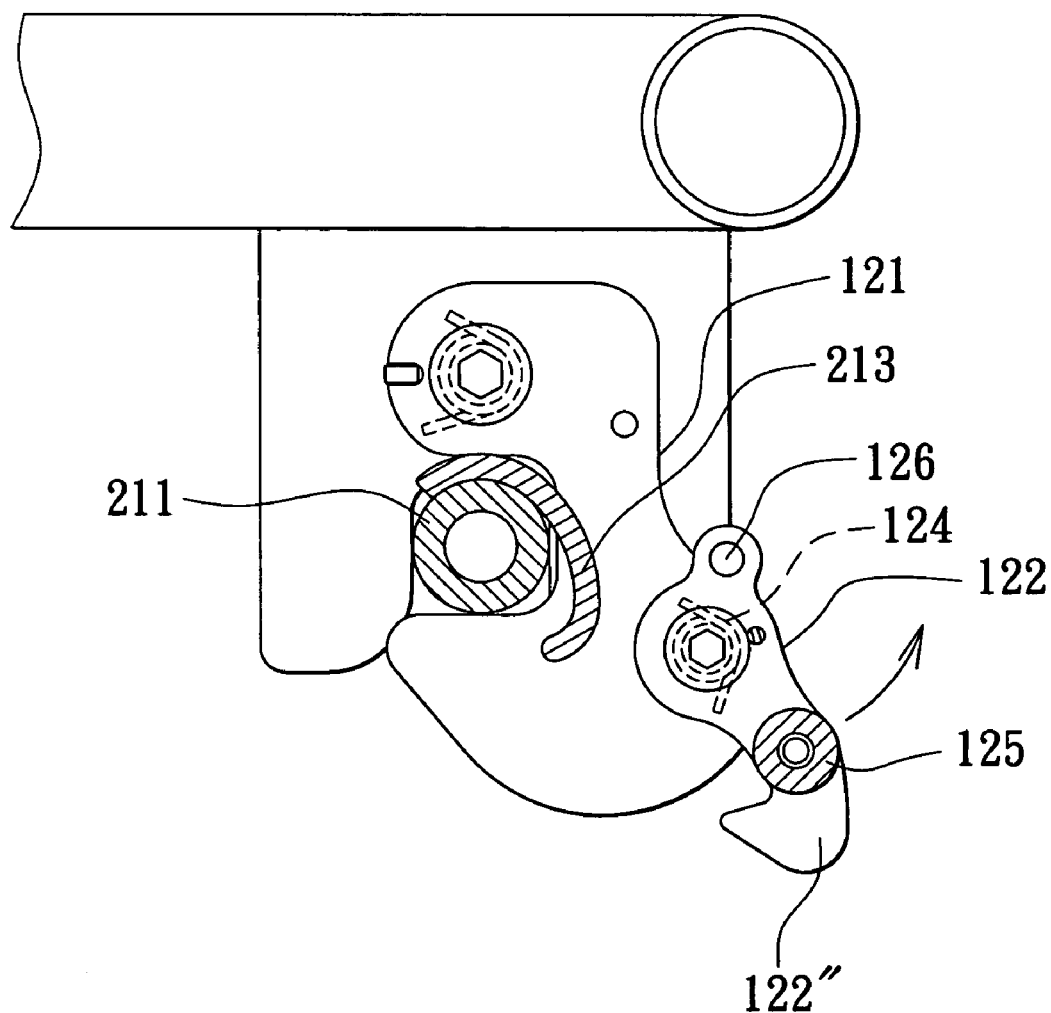
FIG. 6 is a fragmentary schematic side view of the preferred embodiment, illustrating how an actuation rod is operated to rotate a hook plate on a retaining plate.
Figure 7:
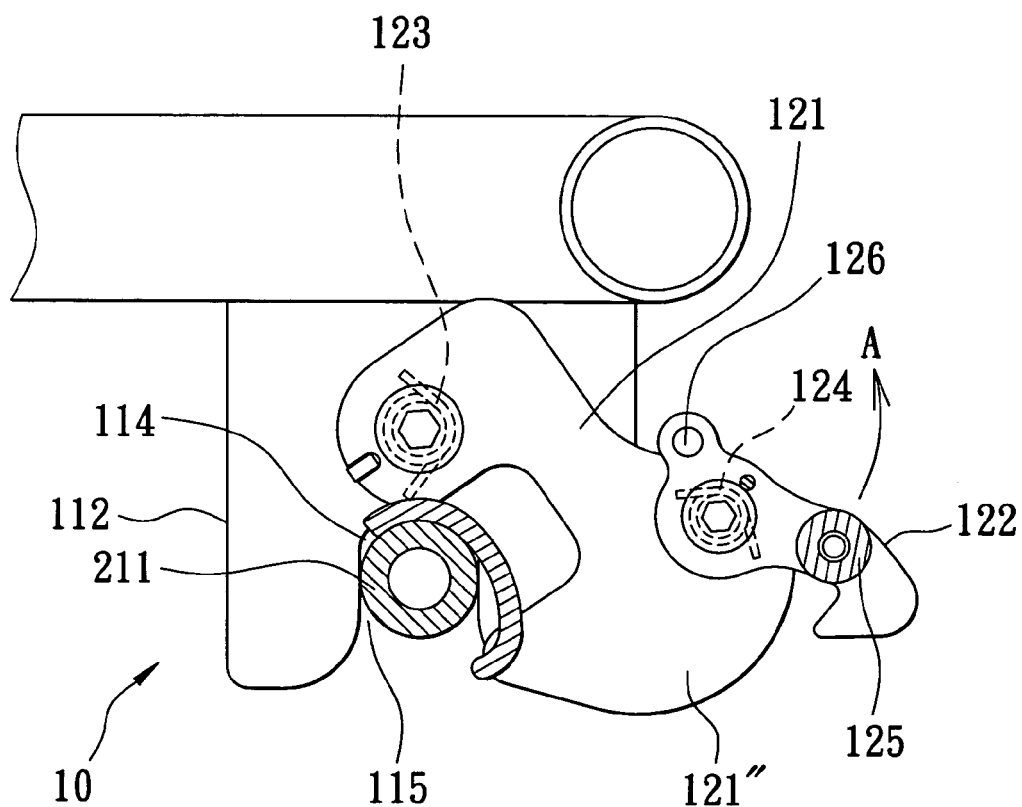
FIG. 7 is a fragmentary schematic side view of the preferred embodiment, illustrating how the retaining plate is rotated with the hook plate on the vehicle frame.
Figure 8:
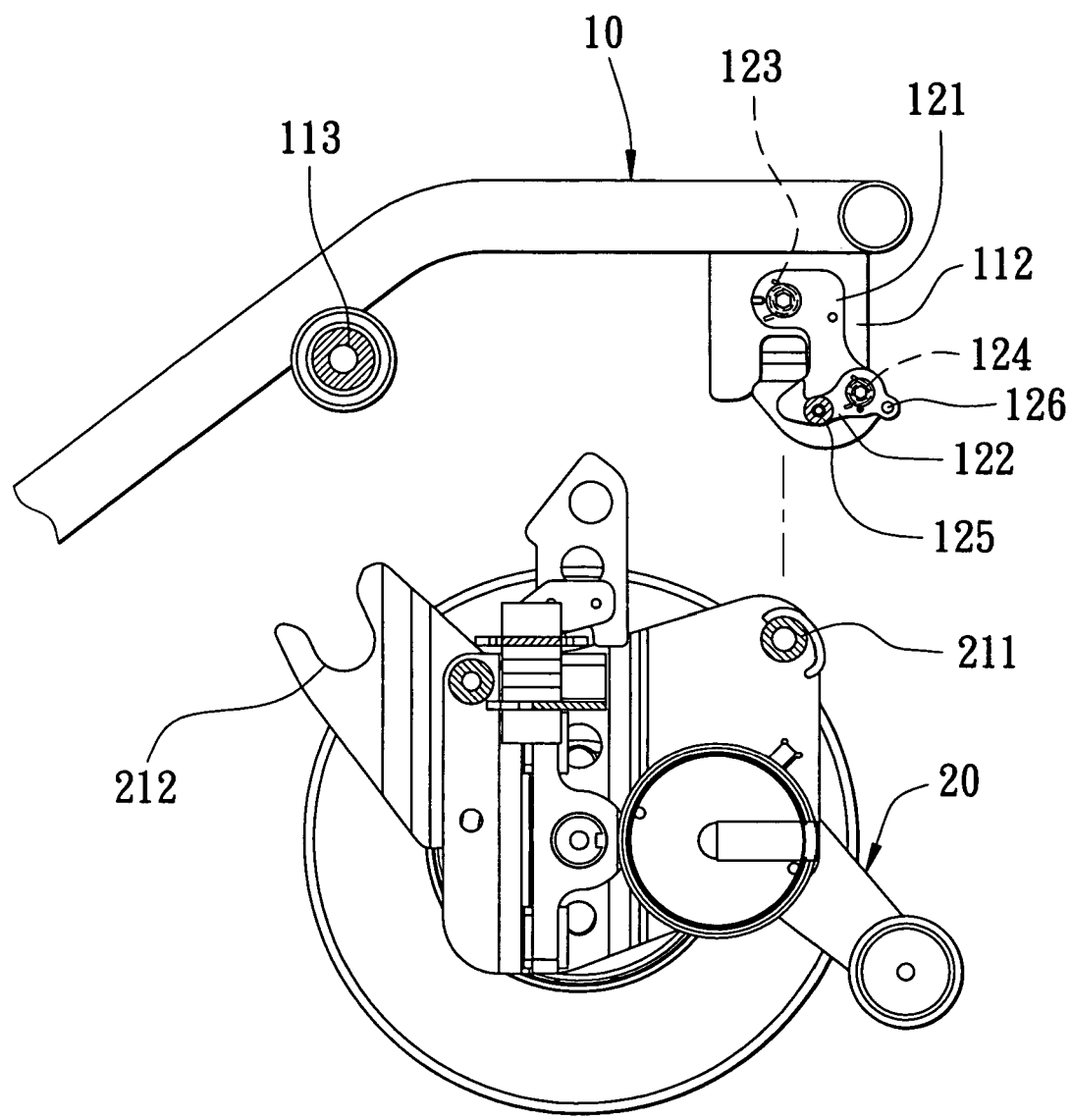
FIG. 8. is a fragmentary schematic side view of the preferred embodiment, illustrating how the vehicle frame is removed from the driving device.

When it is desired to remove the vehicle frame 10 from the driving device 20, the actuation rod 125 is pivoted upwardly to rotate the hook ends 122" of the hook plates 122 on the retaining plates 121 from the engagement positions shown in FIG. 5 to the disengagement positions shown in FIG. 6. When the hook ends 122" are disposed at the disengagement positions, the hook ends 122– are removed from the hook portions 213, and the stop rods 126 come into contact with outer peripheries of the retaining plates 121, as shown in FIG. 6. Referring to FIG. 7, when the actuation rod 125 is further pivoted upwardly, because contact between the stop rods 126 and the outer peripheries of the retaining plates 121 prevents further rotation of the hook plates 122 on the retaining plates 121 in the direction (A), the retaining plates 121 and the hook plates 122 pivot upwardly and synchronously on the vehicle frame 10. As a result, the retaining plates 121 turn to the release positions. Subsequently, referring to FIG. 8, the vehicle frame 10 can be pulled upwardly to separate from the driving device 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A motor-driven vehicle comprising:
   a vehicle frame including
      a main body having at least one first connecting portion and a second connecting portion that are interconnected fixedly, said first connecting portion being formed with a groove that has a lower end opening, and
      a retaining unit including at least one retaining plate having a pivot end disposed pivotally on said first connecting portion of said main body, and a free end rotatable between a blocking position, where said free end engages said opening of said groove in said first connecting portion of said main body so as to close said opening, and a release position, where said free end is disengaged from said groove so as to open said opening, said free end of said retaining plate being biased to said blocking position; and
   a driving device including a support frame disposed under said main body of said vehicle frame, a plurality of wheels mounted rotatably on said support frame, and a driving unit disposed on said support frame for rotating said wheels, said support frame having an elongated first engaging portion disposed within said groove in said first connecting portion of said main body of said vehicle frame, and a second engaging portion engaging said second connecting portion of said main body of said vehicle frame, said free end of said retaining plate preventing removal of said first engaging portion of said support frame from said groove in said first connecting portion of said main body when said free end of said retaining plate is disposed at said blocking position, removal of said first engaging portion of said support frame from said first connecting portion of said main body being allowed when said free end of said retaining plate is disposed at said release position, one of said second connecting portion of said main body and said second engaging portion of said support frame being configured as a tongue, the other of said second connecting portion of said main body and said second engaging portion of said support frame being configured as a groove.

2. The motor-driven vehicle as claimed in claim 1, wherein said first engaging portion of said support frame includes at least one fixed hook portion, said retaining unit further including at least one hook plate having a pivot end disposed pivotally on said retaining plate, and a hook end rotatable on said retaining plate between an engagement position, where said hook end engages said hook portion of said first engaging portion of said support frame so as to prevent rotation of said retaining plate relative to said main body, and a disengagement position, where said hook end is removed from said hook portion of said first engaging portion of said support frame so as to allow the rotation of said retaining plate relative to said main body, said hook end of said hook plate being biased to said engagement position.

3. The motor-driven vehicle as claimed in claim 2, wherein said main body of said vehicle frame includes two said first connecting portions, said first engaging portion of said support frame including two said hook portions, said retaining unit including two said retaining plates and two said hook plates, said retaining unit further including an actuation rod that interconnects fixedly said hook plates and that is pivotable upwardly to rotate said hook end of each of said hook plates on a corresponding one of said retaining plates from said engagement position to said disengagement position.

4. The motor-driven vehicle as claimed in claim 3, wherein each of said hook plates is formed with an integral stop rod that comes into contact with an outer periphery of a corresponding one of said retaining plates when said hook end of the corresponding one of said hook plates rotates from said engagement position to said disengagement position in a direction, contact between said stop rods and said outer peripheries of said retaining plates preventing further rotation of said stop rods on said retaining plates in said direction while allowing for synchronous rotation of said hook plates and said retaining plates on said main body of said vehicle frame in said direction when said actuation rods continue to pivot upwardly, the synchronous rotation of said hook plates and said retaining plates on said main body of said vehicle frame in said direction resulting in rotation of each of said retaining plates from said blocking position to said release position.

* * * * *